United States Patent
Dinh

(10) Patent No.: US 6,956,172 B2
(45) Date of Patent: Oct. 18, 2005

(54) ADJUSTABLE ELECTRICAL OUTLET BOX ASSEMBLY

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/963,135

(22) Filed: Oct. 12, 2004

(65) Prior Publication Data

US 2005/0092510 A1   May 5, 2005

Related U.S. Application Data

(60) Provisional application No. 60/516,432, filed on Oct. 31, 2003.

(51) Int. Cl.[7] .............................................. H01H 9/02
(52) U.S. Cl. ........................... 174/58; 174/57; 174/53; 220/3.2; 220/3.7; 248/906
(58) Field of Search .............................. 174/50, 48, 53, 174/58, 57, 54, 63; 220/3.2, 3.3, 3.4, 3.5, 220/3.6, 3.7, 3.8, 3.9, 4.02; 248/906, 27.3, 248/27.1, 225.11; 439/535, 538; D13/152

(56) References Cited

U.S. PATENT DOCUMENTS

| | | | |
|---|---|---|---|
| 1,519,735 A | * 12/1924 | Kruse | 220/3.9 |
| 2,031,689 A | * 2/1936 | Buckels | 248/906 |
| 3,365,156 A | 1/1968 | Beck | 248/205 |
| 3,720,395 A | 3/1973 | Schuplin | 248/205 R |
| 3,730,466 A | 5/1973 | Swanquist | 248/216 |
| 3,834,658 A | 9/1974 | Theodorides | 248/205 R |
| 4,062,470 A | 12/1977 | Boteler | 220/3.3 |
| 4,140,293 A | * 2/1979 | Hansen | 174/58 |
| 4,214,668 A | 7/1980 | Neff et al. | 220/3.3 |
| 4,447,030 A | * 5/1984 | Nattel | 248/906 |
| 4,747,506 A | 5/1988 | Stuchlik, III | 220/3.9 |
| 4,971,280 A | 11/1990 | Rinderer | 248/229 |
| 5,004,199 A | 4/1991 | Suk | 248/231.8 |
| 5,253,831 A | 10/1993 | Theodorides | 248/27.3 |
| 5,289,934 A | 3/1994 | Smith et al. | 220/3.7 |
| 5,408,045 A | 4/1995 | Jorgensen et al. | 174/58 |
| 5,810,303 A | * 9/1998 | Bourassa et al. | 174/58 |
| 5,841,068 A | 11/1998 | Umstead et al. | 174/58 |
| 6,389,658 B1 | 5/2002 | Pfaller et al. | 24/545 |

* cited by examiner

*Primary Examiner*—Dean A. Reichard
*Assistant Examiner*—Angel R. Estrada
(74) *Attorney, Agent, or Firm*—Hoffmann & Baron, LLP

(57) ABSTRACT

An adjustable outlet box assembly provides for attachment of an outlet box to a wall stud. The assembly includes an outlet box and a box bracket which is adjustably positioned to the outlet box. The box bracket includes a box attachment portion having a deflectable finger for resilient engagement with a side wall of the box. The bracket further includes a stud attachment portion for engagement with the stud. The bracket is adjustably positioned on the box so that the box may be adjustably positioned with respect to the wall stud.

10 Claims, 7 Drawing Sheets

ADJUSTABLE ELECTRICAL OUTLET BOX ASSEMBLY

CROSS-REFERENCE TO RELATED APPLICATIONS

The present application claims priority to provisional application No. 60/516,432, filed Oct. 31, 2003, and entitled "ADJUSTABLE ELECTRICAL OUTLET BOX ASSEMBLY".

FIELD OF THE INVENTION

The present invention relates generally to an outlet box assembly for positioning on a wall stud. More particularly, the present invention relates to an outlet box assembly which permits the adjustable positioning of an outlet box with respect to the stud.

BACKGROUND OF THE INVENTION

Electrical outlet boxes are used in residential and commercial construction to house wire termination devices such as electrical switches and receptacles. The box encloses the termination of the wires to the termination devices. Electrical outlet boxes are secured to wall studs which are covered with wall board or other wall material. The outlet box is positioned such that the open front face of the outlet box lies flush with respect to the surface of the wall board placed over the stud.

Due to variations in the thickness of commercially available wall board, it is often necessary to adjust the position of the box once it is installed on the stud to assure that the open front face of the box lies flush with the wall board. Various securement techniques have been developed to adjustably position the box with respect to the stud so as to accommodate variations in wall board thicknesses.

U.S. Pat. No. 5,253,831 shows a bracket attached to a stud which allows discrete positioning of the outlet box with respect to the face of the wall board mounted thereover.

U.S. Pat. No. 4,747,506 shows an adjustable box mounting assembly where a multi-component bracket allows the slidable positioning of the box.

Each of U.S. Pat. Nos. 3,834,658 and 5,289,934 shows a technique for adjustably mounting an outlet box to a stud where the adjustability is provided by way of screw adjustment.

Finally, U.S. Pat. No. 4,971,280 employs a multi-component clip for adjustably positioning an outlet box with respect to a wall stud.

While each of these devices provide for the adequate adjustment of the outlet box with respect to the wall stud to assure that the open front face of the box lies flush with the wall board applied thereover, each of these devices are cumbersome to assemble and use in the field.

It is, therefore, desirable to provide a simple adjustable outlet box assembly which allows adjustable positioning of the open front face of an outlet box with respect to the wall stud and is easy to assemble and use.

SUMMARY OF THE INVENTION

The present invention provides an adjustable outlet box assembly for attachment to a wall stud. The assembly includes an outlet box having a side wall and an open front face. An integrally formed box bracket includes a stud attachment portion for fixing the bracket to the wall stud. The bracket also includes a side wall attachment portion for slidable attachment to the side wall of the outlet box. The side wall attachment portion includes an engagement member in a biased position for engagement with the side wall for fixing the position of the side wall attachment portion with respect to the side wall of the box. The engagement member is releasable from the engaged position to prevent movement of the side wall attachment portion with respect to the side wall of the box to adjustably position the open face of the box with respect to the stud.

The engagement member may include a deflectable finger with teeth at the end thereof for biting engagement with the side wall of the box.

DETAILED DESCRIPTION OF THE PREFERRED EMBODIMENTS

Figure 1:
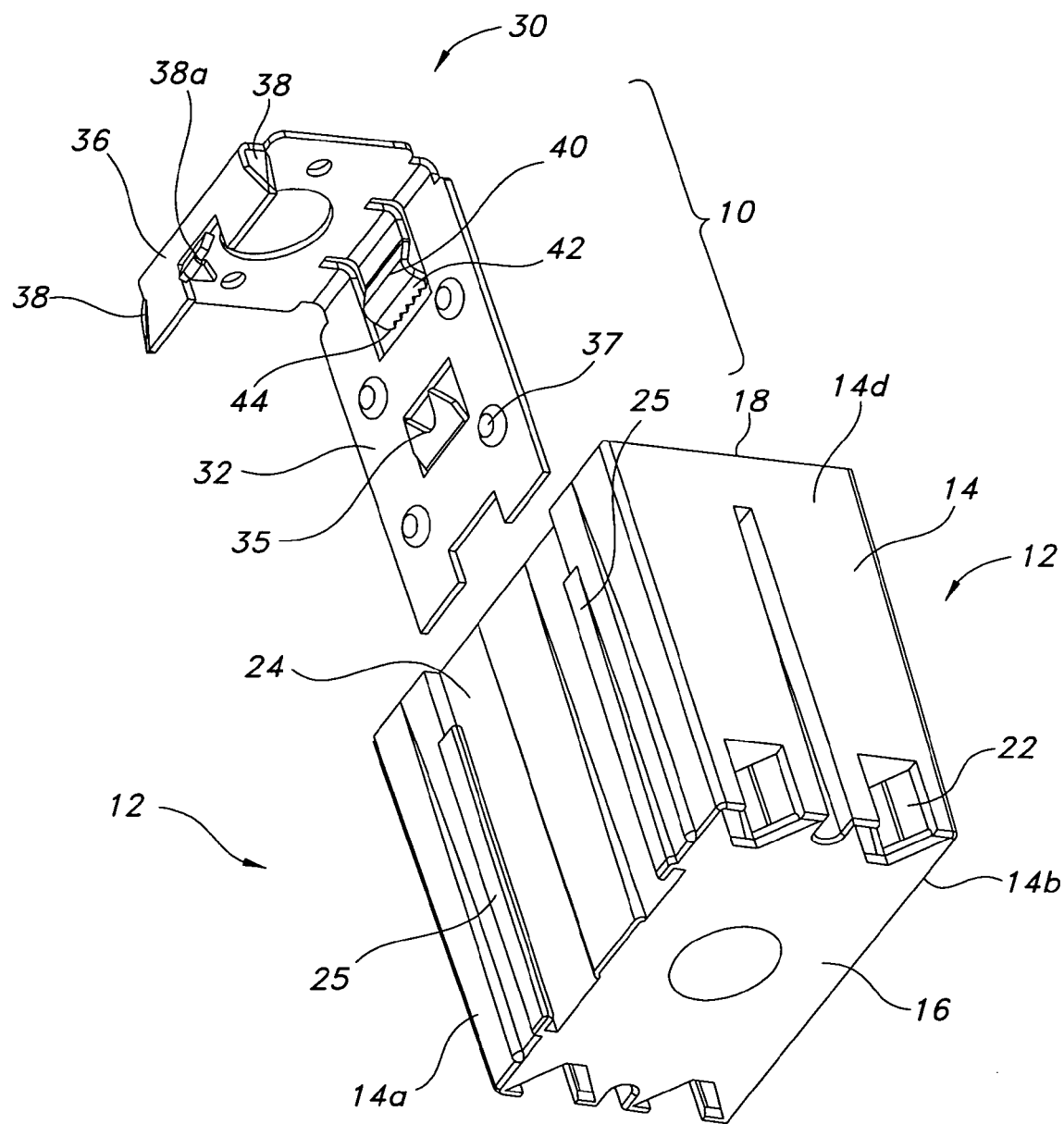
FIGS. 1 and 2 are side perspective views of the components of the outlet box assembly of the present invention.
Figure 2:
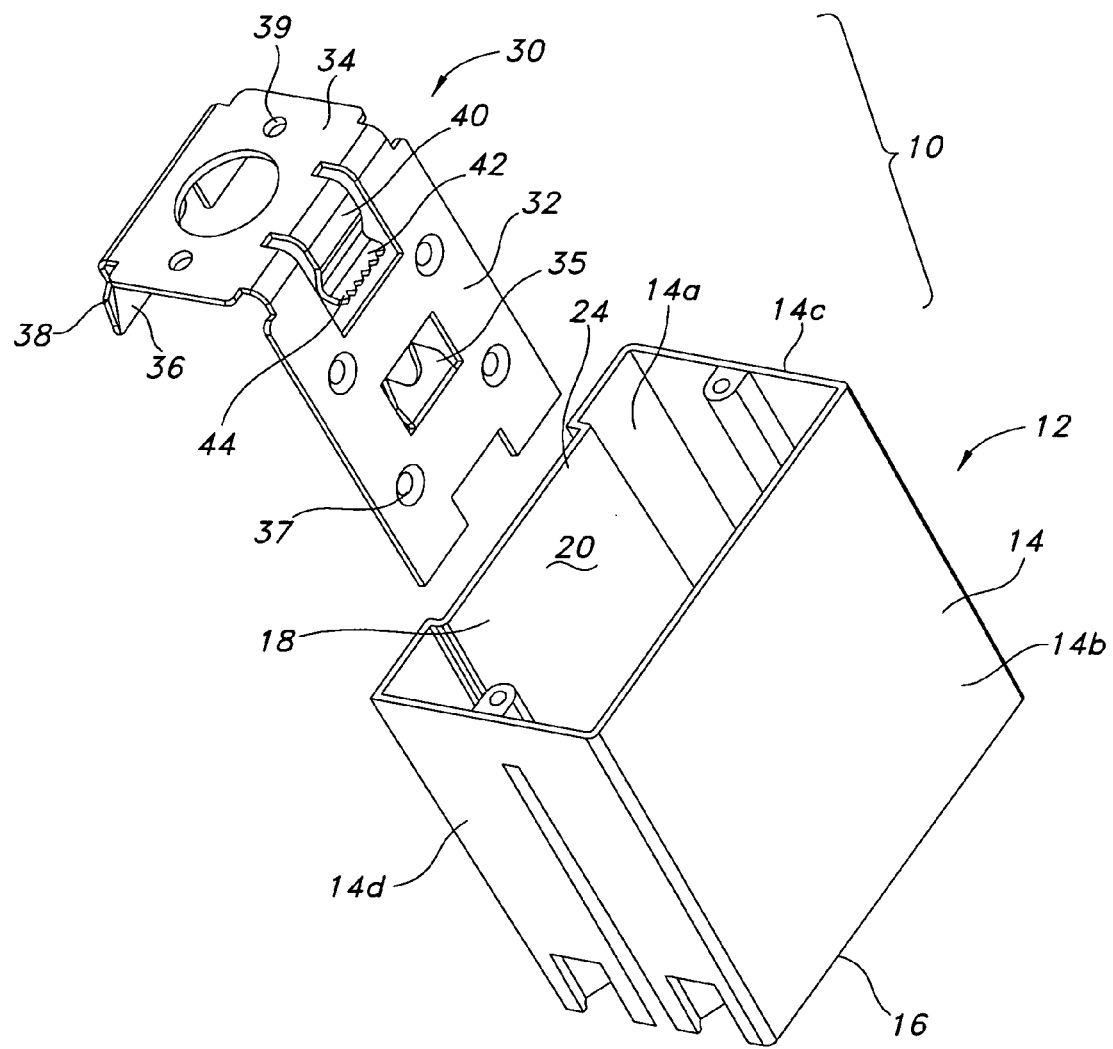

Referring now to FIGS. 1 and 2, the outlet box attachment assembly 10 of the present invention is shown. Assembly 10 includes an electrical outlet box 12 of generally conventional construction. In the present illustrative embodiment, outlet box 12 is a single-gang non-metallic box used to house electrical termination connectors, such as switches and receptacles (not shown), in conventional fashion. While a non-metallic single-gang box is shown by way of preferred embodiment, it may be appreciated that the present invention may be operable with a multi-gang boxes and with boxes of metallic construction.

Outlet box 12 is generally rectangular member having a perimetrical side wall 14 upstanding from a back wall 16. Opposed to back wall 16 is an open front face 18. Open front face 18 allows accessible entry into the box interior 20 which supports termination of electrical wires (not shown) to electrical termination components.

As shown particularly in FIG. 1, the back wall 16 and side wall 14 may include wire entry openings 22 to permit insertion of wires into the interior 20 of box 12. Side wall 14 being perimetrical, includes a pair of lateral walls 14a and 14b as well as top and bottom walls 14c and 14d. Lateral wall 14a includes a recessed portion 24 centrally located therealong. Recessed portion 24 extends between the open front face 18 and the back wall 16 and will be discussed in further detail hereinbelow.

Outlet box attachment assembly 10 further includes an integrally formed box bracket 30. As shown in the drawing box bracket 30 is generally a hook-shaped member formed of steel and is designed for positioning along recessed portion 24 of side wall 14 of box 12 while a hook shape as shown bracket 30 can be other shapes such as L-shaped. Box bracket 30 includes a longitudinal sidewall attachment member 32 which is generally planar in configuration. Longitudinal member 32 includes at one distal end thereof an integrally formed transverse stud attachment member 34 extending therefrom at approximately a right angle.

Transverse member 34 which is also generally planar extends from longitudinal member 32 and may include a distal depending portion 36 extending generally parallel to longitudinal member 32 thereby forming the hook shape. Traverse member 34 has an extent which is generally coextensive with the face 15a of a stud 15 (FIG. 5) to which it is mounted so that box bracket can be attached to the stud with the transverse portion 34 lying flush with the face 15a of the stud. Hook member 36 includes a pair of spaced apart inwardly directed barbs 38 which are provided for biting engagement with a side 15b of wood stud 15 to secure the box bracket to the stud. The central barb 38 may be forced inwardly upon attachment, to further secure the bracket to the stud. The transverse portion 34 further includes a pair of mounting apertures 39 to allow insertion of a fastening member such as a screw or nail to permanently secure the box bracket to the face 15a of the stud.

To facilitate the mounting of bracket to the stud, longitudinal member 32 includes plural inwardly directed dimples 37 which frictionally engage the side 15c of the stud. Also, longitudinal member 32 includes an inwardly directed lance 35 for biting engagement into the side 15c of the stud.

Figure 3:
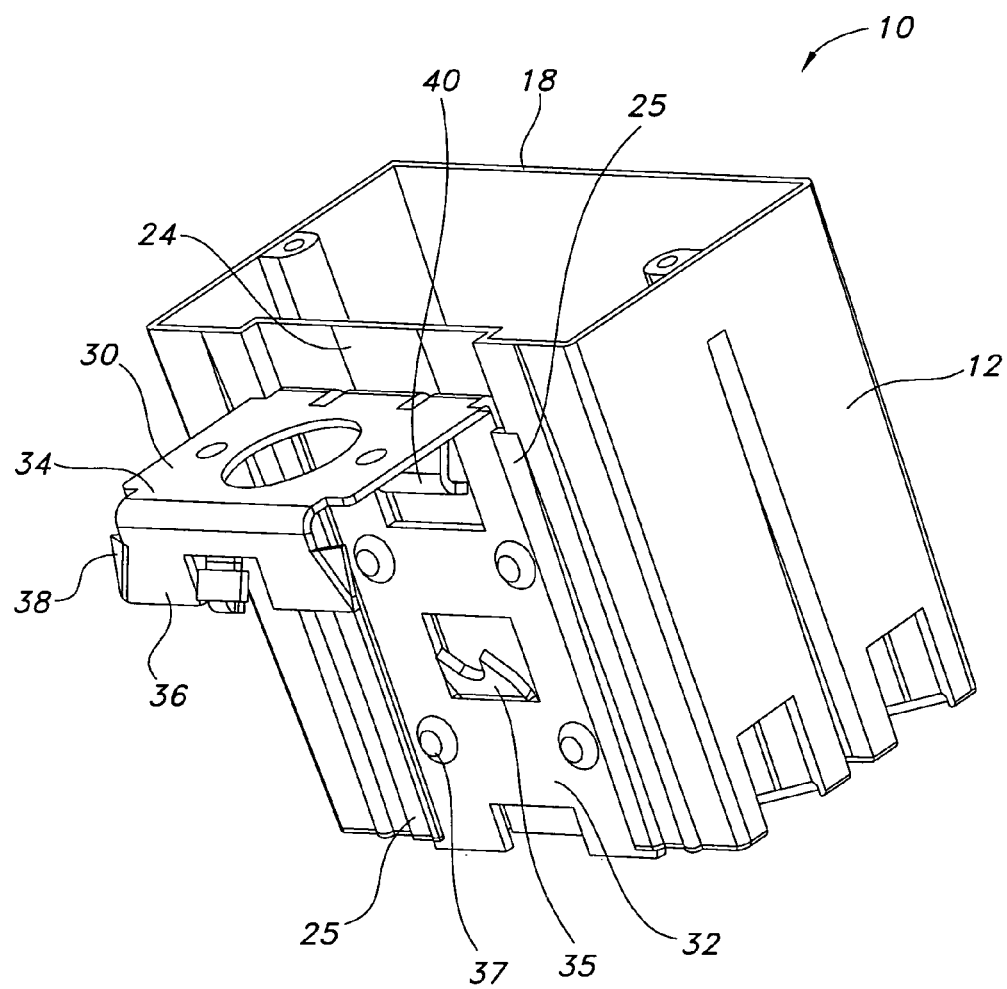
FIGS. 3 and 4 are perspective showings of the assembled outlet box assembly of FIGS. 1 and 2.
Figure 4:
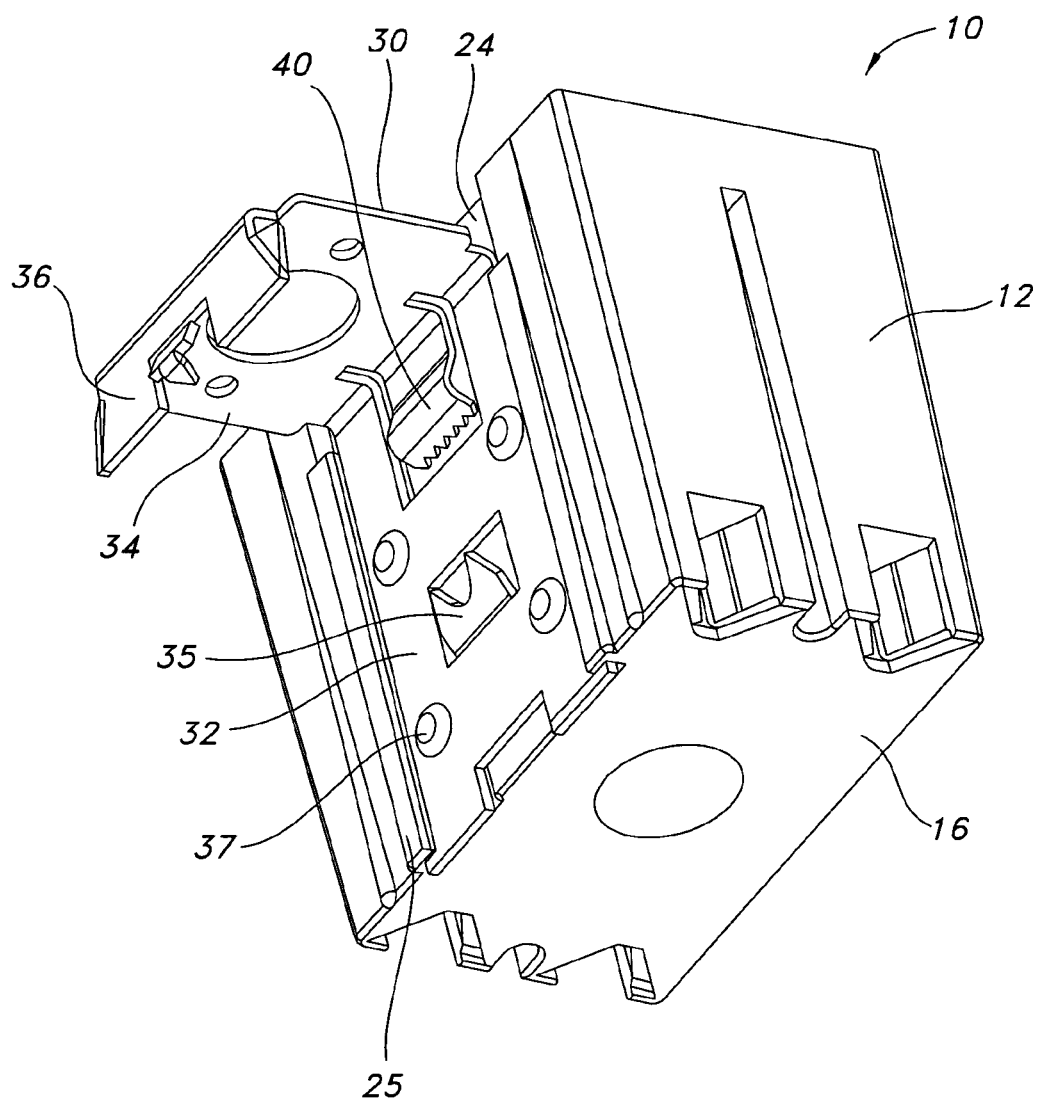

As shown in FIGS. 3 and 4, box bracket 30 is slidably positioned along the lateral wall 14a of outlet box 12 being received within the recessed portion 24 thereof. A pair of retaining rails 25 formed on lateral wall 14a on either side of recessed portion 24 provides a retaining track to support the longitudinal member 32 of bracket 30 to the outlet box. In the position shown in FIGS. 3 and 4, the bracket 30 is slidably moveable with respect to the side wall 14 of outlet box 12.

In order to fix the position of bracket 30 respect to outlet box 12, bracket 30 includes a biased deflectable cantilevered finger 40. Cantilevered finger 40 is biasingly directed toward the recessed portion 24 of outlet box 12 so that distal tip 42 is positioned in engagement with the side wall of the box. Distal tip 42 includes a plurality of teeth 44 which tend to bite into the plastic side wall of box 12 to secure the bracket at a desired position therealong.

Figure 5:
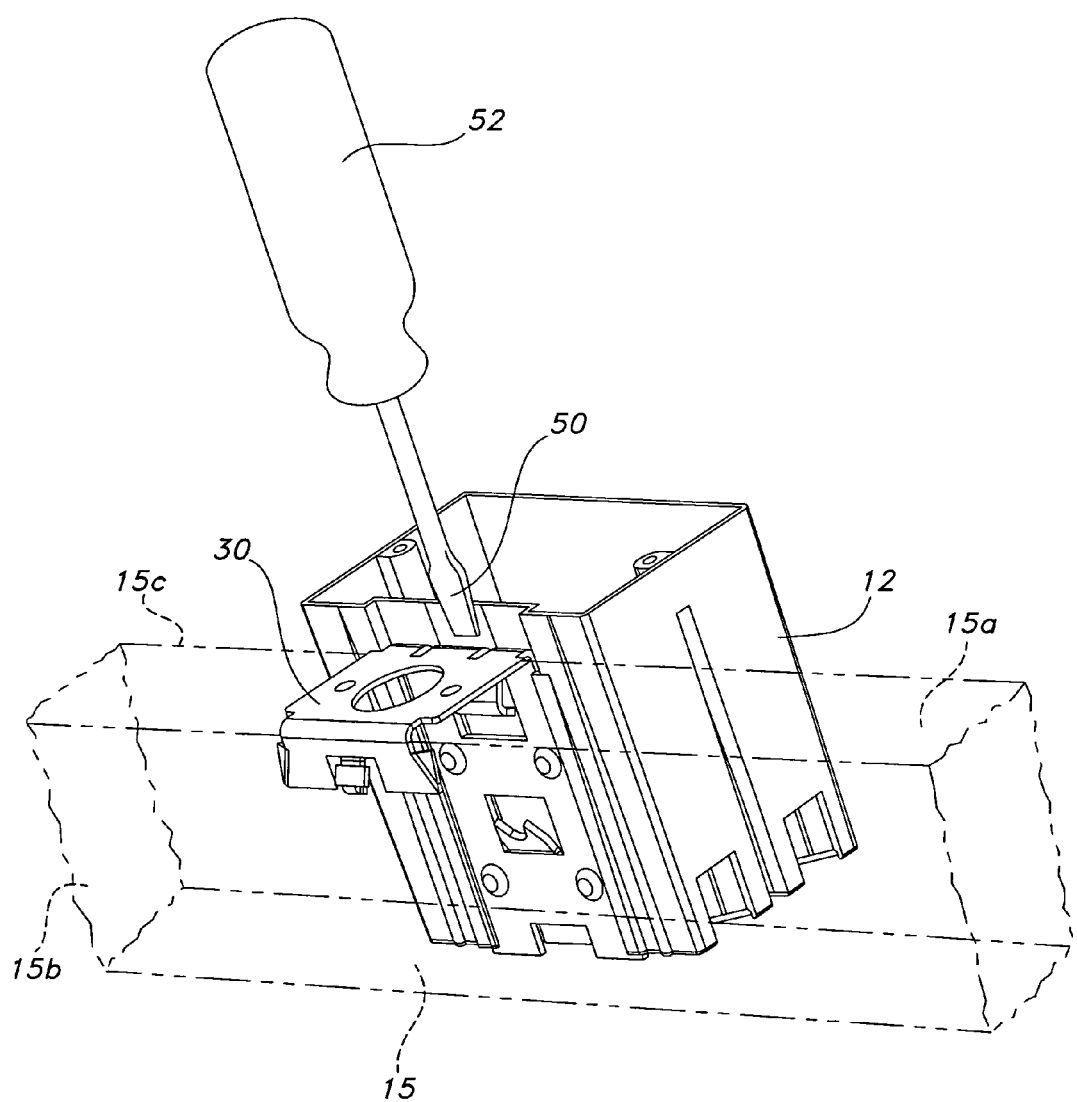
FIG. 5 is a perspective showing of the outlet box assembly of FIG. 1 attached to a wall stud shown in phantom.

Movement of the bracket 30 with respect to box 12 is achieved by deflecting finger 40 out from engagement with the side wall of the box so that the bracket may be moved with respect to the side wall of the box. As shown in FIG. 5, a blade 50 of a screwdriver 52 may be inserted between the side wall of the box and the box bracket to manually deflect the finger 40 out from biting engagement with the side wall of the box. This allows the box to be moved along the longitudinal portion 32 of box bracket 30 to a desired position with respect to the stud. Once the open front face of the box is properly positioned with respect to the stud, the screwdriver 52 is removed and the finger 40 will biasingly engage the lateral wall 14a of box 12. The biting engagement between the teeth 44 and the lateral wall 14a will prevent longitudinal movement of the box with respect to the bracket.

Thus, the present invention provides for the adjustable positioning of the open front face 18 of the outlet box with respect to the stud with an integrally formed box bracket requiring no assembly of components or mechanical mechanism for achieving such adjustment. The installer merely releases the finger 40 from biting engagement with the box and slides the box to the desired position. Release of the finger 40 automatically causes biting engagement with the side wall of the box fixing the position of the box with respect to the stud.

Figure 7:
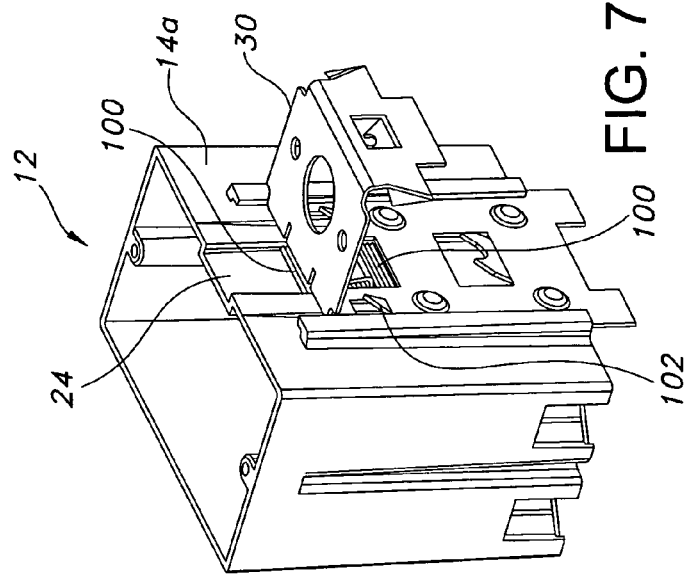
FIG. 7 is a perspective showing of the assembled outlet box of FIG. 6.
Figure 6:
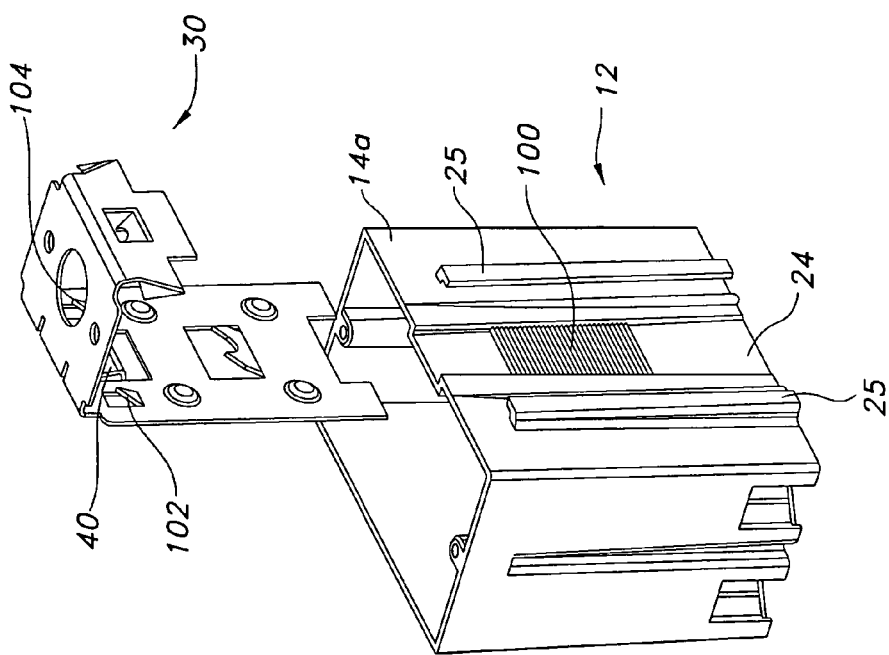
FIG. 6 is a perspective showing of the components of a further embodiment of the outlet box assembly of the present invention.

A further embodiment of the present invention is shown with respect to FIGS. 6 and 7. In the present embodiment, the outlet box has been modified to include a plurality of transverse ribs 100 which are centrally located along recessed portion 24 of outlet box 12. The ribs 100 are longitudinally spaced so that the cantilevered finger 40 can be adjustably positioned to reside between two adjacent ribs 100. The transverse ribs 100 provide for enhanced locking engagement with cantilevered finger 40 of bracket 30 at discrete locations along the side wall. Such engagement between cantilevered finger 40 and transverse ribs 100 increase the retention of the bracket 30 on box 20. Also, as shown in FIG. 6, the recessed portion 24 is of narrower extent so that rails 25 lie on lateral wall 14a out board of recessed portion 24.

In the embodiment shown in FIGS. 6 and 7, bracket 30 further includes a pair of lances 102 and 104. Lances 102 and 104 are struck inwardly from longitudinal member 32 to assist in securing the bracket 30 in snap fit engagement with the stud.

Figure 9:
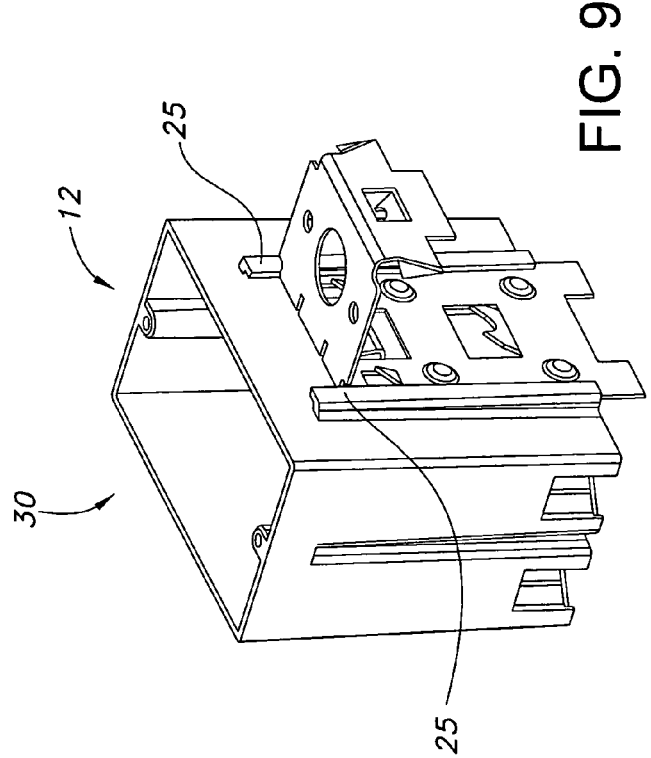
FIG. 9 is a perspective showing of the assembled outlet box of FIG. 8.
Figure 8:
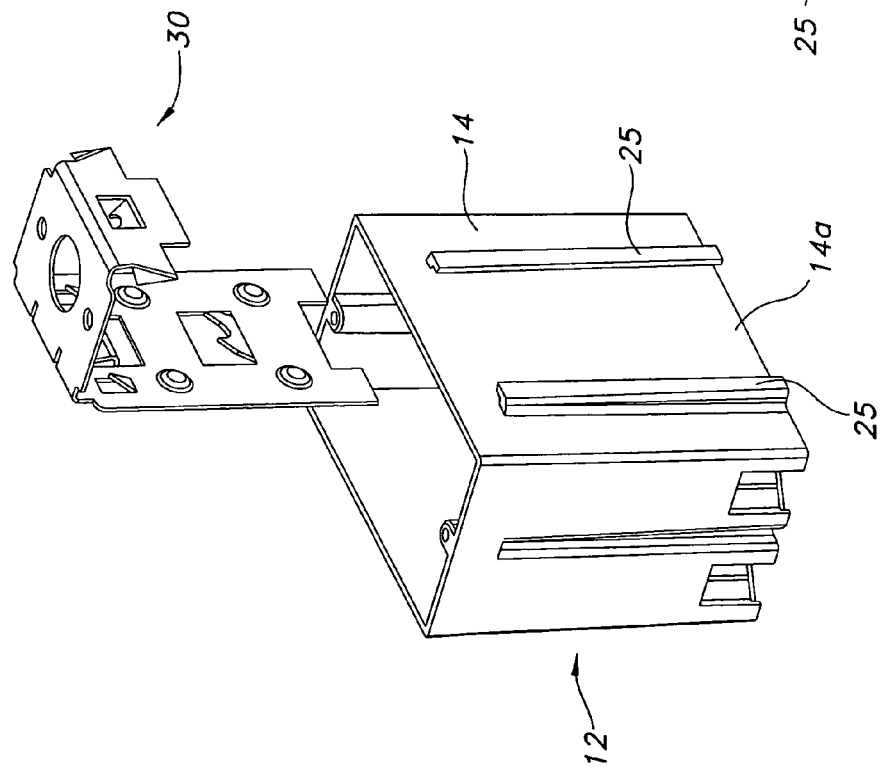
FIG. 8 is a perspective showing of the components of an outlet box assembly of a further embodiment of the present invention.

Referring now to FIGS. 8 and 9 a still further embodiment of the present invention is shown. The embodiment of FIGS. 8 and 9 is substantially similar to the embodiment of FIGS. 6 and 7, however, the lateral wall 14a of box 12 is uniformly planar thereacross without providing a recess portion to receive bracket 30. In the embodiments of FIGS. 8 and 9, the rails 25 maintain the bracket 30 in slidable engagement along the face of lateral wall 14a in an arrangement similar to that shown in FIGS. 6 and 7.

Various changes to the foregoing described and shown structures will now be evident to those skilled in the art. Accordingly, the particularly disclosed scope of the invention is set forth in the following claims.

What is claimed:

1. An adjustable outlet box assembly for attachment to a wall stud comprising:
   an outlet box having a side wall and an open front face; and
   an box bracket, said bracket including a stud attachment portion for fixing said bracket to said wall stud and a side wall attachment portion for slidable attachment to said side wall of said outlet box;
   said side wall attachment portion including an engagement member biasingly positioned for engagement with said side wall for biting engagement with said side wall so as to fix the position of said side wall attachment portion with respect to said side wall;
   said engagement member being releaseable from said engagement with said side wall to permit movement of said side wall attachment portion with respect to said side wall to adjustably position said open face of said box with respect to said stud.

2. An adjustable outlet box assembly of claim 1 wherein said engagement member includes a deflectable finger.

3. An adjustable outlet box assembly of claim 2 wherein said deflectable finger includes at least one tooth.

4. An adjustable outlet box assembly of claim 1 wherein said side wall attachment portion includes an extending lance for biting engagement with said stud upon attachment of said bracket to said stud.

5. An adjustable outlet box assembly of claim 1 wherein said stud attachment portion includes at least one barb for engagement with said stud.

6. An adjustable outlet box of claim 1 wherein said stud attachment portion includes a hook shaped portion for attachment to said stud.

7. An adjustable outlet box of claim 6 wherein said hook shaped portion includes a plurality of barbs for biting engagement with said stud.

8. An adjustable outlet box of claim 1 wherein said outlet box side wall includes a pair of spaced apart rails for slidably accommodating said side wall attachment portion.

9. An adjustable outlet box assembly for attachment to a wall stud comprising:

an outlet box having a side wall and an open front face; and an box bracket, said bracket including a stud attachment portion for fixing said bracket to said wall stud and a side wall attachment portion for slidable attachment to said side wall of said outlet box;

said side wall attachment portion including an engagement member biasingly positioned for engagement with said side wall for fixing the position of said side wall attachment portion with respect to said side wall;

said engagement member being releaseable from said engagement with said side wall to permit movement of said side wall attachment portion with respect to said side wall to adjustably position said open face of said box with respect to said stud;

wherein said side wall includes a plurality of transversely extending longitudinally spaced ribs, said engagement member being adjustably positionable between two adjacent said ribs for fixing the position of said side wall attachment portion.

10. An adjustable outlet box assembly for attachment to a wall stud comprising:

an outlet box having a side wall and an open front face; and an box bracket, said bracket including a stud attachment portion for fixing said bracket to said wall stud and a side wall attachment portion for slidable attachment to said side wall of said outlet box;

said side wall attachment portion including an engagement member biasingly positioned for engagement with said side wall for biting engagement with said side wall so as to fix the position of said side wall attachment portion with respect to said side wall;

said engagement member being releaseable from said engagement with said side wall to permit movement of said side wall attachment portion with respect to said side wall to adjustably position said open face of said box with respect to said stud;

wherein said side wall attachment portion includes a plurality of inwardly directed dimples for frictional engagement with said stud.

* * * * *